May 3, 1932.  J. W. HORTON  1,856,707

FREQUENCY MEASURING CIRCUITS

Filed March 28, 1928

INVENTOR
JOSEPH W. HORTON
By J. P. Neville
ATTORNEY

Patented May 3, 1932

1,856,707

UNITED STATES PATENT OFFICE

JOSEPH W. HORTON, OF MILLBURN, NEW JERSEY, ASSIGNOR TO WESTERN ELECTRIC COMPANY, INC., OF NEW YORK, N. Y., A CORPORATION OF NEW YORK

FREQUENCY MEASURING CIRCUITS

Application filed March 28, 1928. Serial No. 265,244.

This invention relates to methods and circuits for measuring frequency and has for an object to improve the accuracy of frequency measurements.

In the usual type of wave meter or frequency measuring circuit a meter is associated with a simple tuned circuit, which is supplied with the wave to be measured. The tuned circuit is adjusted until a maximum indication is obtained in the meter. When this occurs the circuit is considered to be tuned to the frequency of the wave being measured.

Such a system depends for its operation on the variation in amplitude of the current flowing through the tuned circuit. It has the inherent disadvantage that near the point of resonance the rate of change of indication is a minimum, and in fact substantially zero. Also, in this range, the variation in the indication is a very small portion of the total variation which the meter must indicate. Under the most favorable conditions there is a small frequency range, adjacent the resonant point of the tuned circuit, at which the rate of change of indication is negligibly small.

A particular object of this invention is to provide a frequency measuring circuit in which the rate of change of indication is a maximum near the point of adjustment.

In a specific form of this invention, the wave to be measured is applied to a tuned circuit and to a resistance element. The inductance element of the tuned circuit is inductively coupled with a secondary coil having a mid-tap, to provide two balanced windings. The voltages across the two windings of the coil with respect to the mid-point, will be equal and 180° out of phase with one another. The phase of these voltages with respect to the voltage across the resistance element will depend upon the frequency of the wave and will be in quadrature therewith when the tuned circuit is resonant at the frequency of the wave being measured.

The mid-point of the secondary coil is connected to one terminal of a portion of the resistance element. The two voltages, representing the vector sum of the voltages across the portion of the resistance and each half of the secondary coil, respectively, are impressed upon the respective grids of a pair of electric discharge rectifiers.

A meter, connected between the anodes of the rectifiers, will give a reading which is a measure of the numerical difference between the voltages impressed upon the grids. This reading will depend upon the phase characteristic of the tuned circuit and will be zero when the circuit is tuned exactly to the frequency of the wave being measured. The reading will vary at a maximum rate as the frequency to which the circuit is tuned varies in either direction from that value.

The invention, while described above in a particular embodiment, is not limited thereto, for example, thermocouples may be used in place of electric discharge rectifiers. The invention may be employed in other types of circuits, where a response which varies as a function of frequency is required.

The tuned circuit may be either a series or parallel resonant circuit and may be connected either in shunt to or in series with the resistance element.

The invention will be more readily understood by reference to the following detailed description in connection with the drawings; in which, Fig. 1 shows a simplified circuit diagram illustrating the principle of operation of the invention;

Figure 1:
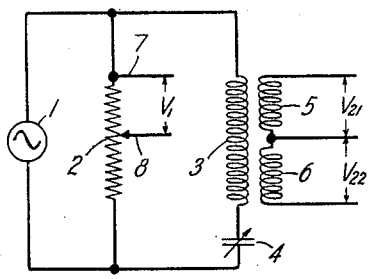

Referring to Fig. 1, there is shown a source of waves 1 connected to a parallel circuit. One arm comprises a resistance element 2 and the other arm an inductance element 3 and a variable condenser 4 connected in series. Inductively associated with the element 3 is a secondary coil having two balanced windings 5 and 6.

There appears across a portion of the resistance element 2 a voltage $V_1$, and across the windings 5 and 6, voltages $V_{21}$ and $V_{22}$, respectively. The voltages $V_{21}$ and $V_{22}$ will depend in value upon the current through the inductance element 3, and they will be equal to each other in absolute value and of opposite phase. When the resonant circuit 3—4 is tuned to the frequency of the wave generated by source 1, the current therethrough is in phase with the current in resistance 2 and the voltages $V_{21}$ and $V_{22}$ across the secondary windings 5 and 6 are in quadrature with the voltage developed across the resistance.

By connecting the common terminal of the secondary windings 5 and 6 to one of the terminals 7 or 8 of the resistance 2, two voltages, $V_a = V_1 + V_{21}$ and $V_b = V_1 + V_{22}$, can be obtained.

Since the voltages $V_{21}$ and $V_{22}$ are equal in absolute value and of opposite phase, these two voltages $V_a$ and $V_b$, respectively, represent the difference and the sum of the voltage across the resistance and the voltage across half of the secondary coil.

When the two voltages, $V_a$ and $V_b$ are rectified, a measure of their numerical difference may be obtained from the difference of the rectified currents. As may be seen from the vector diagram of Fig. 2 (referred to below), this difference will be zero at the point of resonance, and will vary rapidly from that value as the point of resonance is departed from.

Figure 2:
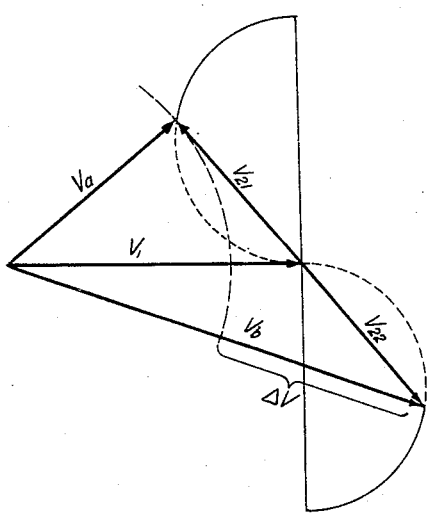
Fig. 2 shows a vector diagram illustrating the relation of the various voltages in the circuit of Fig. 1.

Fig. 2 shows the relation of the various voltages in the circuit of Fig. 1 when the voltage of the source 1 is maintained constant. As is well recognized, in any series circuit containing resistance inductance and capacity, the locus of the current as the capacity is varied is a circle the diameter of which corresponds to the amplitude of the current at resonance, provided the voltage across the circuit is constant.

If we assume in this particular case that the changes in frequency are so small that the mutual impedance may be considered constant, the secondary voltages $V_{21}$ and $V_{22}$, which depend in value upon the current, may be drawn through the end of the voltage $V_1$ in the manner shown, the error in assuming their loci as circular being negligible. The vectors representing these voltages of course lie upon a single straight line. By drawing in the voltages $V_a$ and $V_b$, as shown, the voltages representing the difference in their numerical values will be $\Delta V$.

Figure 3:
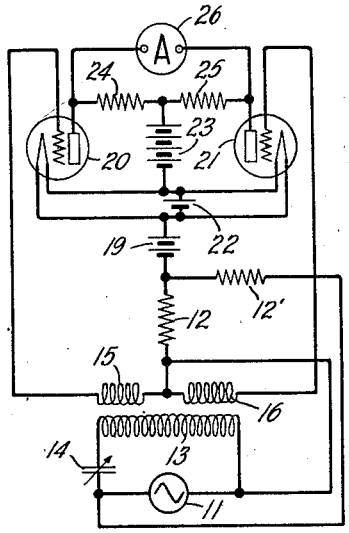
Fig. 3 shows diagrammatically a complete circuit of one embodiment of the invention.

Fig. 3 shows a complete circuit embodying the fundamental circuit of Fig. 1 and including in addition rectifiers and measuring instruments for indicating the adjustment of the circuit. In this circuit, waves from a source 11 to be measured are supplied to a parallel circuit, one arm of which comprises the resistances 12 and 12' in series, and the other arm an inductance element 13 and variable condenser 14 in series. Inductively associated with the element 13 is a secondary coil having two balanced windings 15 and 16.

One terminal of the resistance element 12 is connected to the common terminal of the windings 15 and 16, the other terminal of the resistance element 12 is connected through the grid biasing battery 19 to the cathodes of two balanced electric discharge rectifiers 20 and 21. The other terminals of the windings 15 and 16 are connected to the grids of the rectifiers 20 and 21, respectively.

Heating current is supplied to the cathodes of the rectifiers 20 and 21 from a battery 22. Space current is supplied to the rectifiers 20 and 21 from a battery 23 through resistances 24 and 25, respectively. An ammeter 26 is connected between the anodes of the rectifiers 20 and 21 for giving an indication of the difference of the rectified output currents.

The difference indicated by the meter 26 will be a measure of the numerical difference $\Delta V$ of the vector sum and the vector difference of the voltages applied to the inputs of the rectifiers 20 and 21. Thus, when the condenser 14 is adjusted to such a point that the indication given by the instrument 26 is zero, the circuit 13—14 will be tuned to the frequency of the waves supplied by the source 11, and by properly calibrating the condenser 14 a direct measure of the frequency may be obtained.

Figure 4:
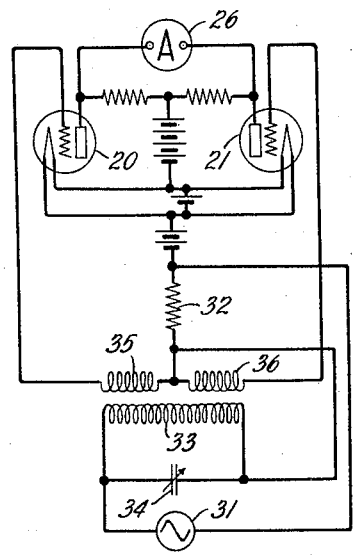
Fig. 4 shows diagrammatically a modification of the circuit of Fig. 3.

Fig. 4 shows a modification of the arrangement of Fig. 3, in which a parallel resonant circuit connected in series with a resistance is employed in place of a series resonant circuit connected in parallel with a resistance. In this circuit waves from a source 31 are supplied to a resistance 32 connected in series with a resonant circuit comprising an inductance 33 and variable condenser 34. In other respects, the circuits of Figs. 3 and 4 are identical, one terminal of the resistance 32 being connected to the common terminal of the windings 35 and 36 of a secondary coil inductively associated with the inductance element 33, and the resulting combined voltages are supplied to the input circuits of the rectifiers 20 and 22.

In many cases the circuit arrangement of Fig. 4 will be found preferable to that of Fig. 3, since the use of the parallel resonant circuit will usually give a better matching of circuit impedances with rectifying impedances. The circuit of Fig. 4 is also well suited for use with constant current sources and the circuit of Fig. 3 with constant voltage sources.

As stated above, other types of rectifiers may be employed in place of electric discharge rectifiers. When employing rectifiers other than electric discharge rectifiers is may be found preferable to use the parallel connection as shown in Fig. 3.

What is claimed is:

1. A frequency measuring device comprising a resistance element, a tuned circuit including a reactance element, means for supplying the wave to be measured to said elements, and means for obtaining and comparing voltages corresponding respectively to the sum and difference of a voltage substantially equal to the voltage across said resistance element and a voltage dependent in value upon the current through said reactance element.

2. In combination, a source of waves, a resistance element, a resonant circuit comprising capacity and inductance elements, means for supplying said resistance element and said resonant circuit with waves from said source, means for obtaining a voltage depending in value on the current flowing through said inductance element, and means for comparing the vector sum and difference of said voltage and a voltage substantially equal to the voltage drop in said resistance element.

3. In combination, a source of waves, a resistance element, an adjustable resonant circuit comprising an inductance element, means for supplying said resistance element and said resonant circuit with waves from said source, means for obtaining a voltage of value proportional to the rate of change of current through said inductance element, and means for comparing the vector sum and difference of said voltage and a voltage substantially equal to the voltage drop in said resistance element.

4. A frequency measuring device comprising a resistance element, an adjustable resonant circuit comprising a reactance element, said resistance element and said resonant circuit being supplied with the wave to be measured, means for obtaining a voltage of value proportional to the rate of change of current through said reactance element, and means for comparing the sum and difference of said voltage and a voltage substantially equal to the voltage drop in said resistance element.

5. A frequency measuring circuit comprising a resonant circuit having a variable reactance element and a fixed reactance element, said resistance element and said resonant circuit being supplied with the wave to be measured, means for obtaining a first voltage of value proportional to the rate of change of current through said fixed reactance element, means for obtaining a second voltage substantially in phase with the voltage supplied to said resonant circuit, and means for comparing the vector sum and difference of said first and second voltages.

6. A frequency measuring circuit comprising a resistance element, an adjustable resonant circuit having an inductance element, said resistance element and said resonant circuit being supplied with the wave to be measured, a second inductance element magnetically coupled to said first inductance element, and means for comparing the sum and difference of the voltage induced in said second inductance element and a voltage substantially in phase with the voltage drop across said resistance element.

7. The method of measuring the frequency of an electric wave by means of a variable tuned circuit which comprises impressing the wave to be measured on the tuned circuit, obtaining voltages corresponding respectively to the sum and difference of a voltage substantially in phase with the voltage supplied to the tuned circuit and a voltage depending in value upon the current through said tuned circuit, and adjusting said tuned circuit until said sum and difference voltages are numerically equal.

8. The method of measuring the frequency of an electric wave by means of a variable tuned circuit which comprises impressing the wave on the tuned circuit, obtaining voltages corresponding respectively to the vector sum and difference of a voltage substantially in phase with the voltage supplied to the tuned circuit and a voltage proportional to the rate of change of current through the tuned circuit, rectifying said sum and difference voltages, comparing the rectified voltages, and adjusting the tuned circuit until the rectified voltages are equal.

In witness whereof, I hereunto subscribe my name this 26th day of March, 1928.

JOSEPH W. HORTON.